Figure 1:
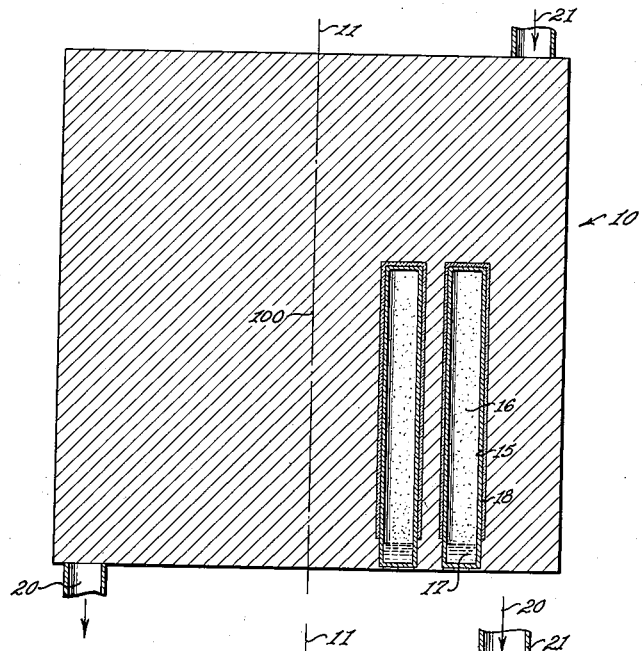

April 11, 1961  M. R. DUSBABEK  2,979,450
NUCLEAR REACTOR CONTROL DEVICE
Filed Feb. 25, 1957

MARK R. DUSBABEK
INVENTOR

BY  H. Calvin White

ATTORNEY

United States Patent Office 2,979,450
Patented Apr. 11, 1961

2,979,450
NUCLEAR REACTOR CONTROL DEVICE

Mark R. Dusbabek, Los Angeles, Calif., assignor to The Fluor Corporation, Ltd., Los Angeles, Calif., a corporation of California Filed Feb. 25, 1957, Ser. No. 641,973

8 Claims. (Cl. 204—193.2)

This invention relates generally to devices for controlling the reactivity of nuclear reactors, and more particularly has to do with devices inserted into reactor cores to absorb neutrons produced therein so as to control the neutron production rates and hence the reactivity of reactors. The invention is directed specifically to the provision of a device which is self-acting in response to temperature changes in the reactor core to increase or decrease its neutron absorption capacity, with the result that the device has the effect of increasing the negative temperature coefficient of reactivity of a nuclear chain reactor.

In general, nuclear reactors are characterized as having a reactivity dependence or association with reaction temperature, so that their reaction rates increase or decrease with rises in temperature. For example, the reactivity of properly proportioned moderated reactors decreases with temperature as a result of moderator expansion and escape of neutrons, whereas the reactivity of small-size, so-called "fast breeder" reactors increases with temperature under certain conditions. This reactivity dependence on temperature is known and can be expressed mathematically for purposes of computation as the temperature coefficient of reactivity, which is negative for stable reactors such as the water-moderated type, and is positive for unstable reactors. Most reactors have normally negative temperature coefficients; however, there are certain effects which change the temperature coefficients of reactivity of stable reactors to less negative values, tending to make such reactors less stable, and it is found that reactors having small negative temperature coefficients are unstable to rapid load changes. Since unstable reactors are dangerous from the standpoint of radioactive contamination and possible explosion, it is desirable to artificially increase the negative temperature coefficient of reactivity, or in other words to decrease the rate of neutron production in the core when its temperature and neutron production rates increase beyond desired values.

In the past artificial controls used for the above purposes have generally comprised solid control rods made of neutron absorbent material, together with auxiliary temperature sensing devices operating electrical circuitry and mechanical actuators which cause the rods to be inserted into or removed from reactor cores, such systems being rather complex in their construction and operation so as to increase the risk of malfunction or failure. Since the control of a reactor is so important, a need has developed for a simple device not dependent upon the operation of external electrical and mechanical components for achieving desired increased neutron absorption in response to temperature increase in the reactor core.

The present invention, which is contemplated as fulfilling the above need, consists essentially of a vapor pressure container one portion of which extends into a reactor core, with a neutron absorber in vapor phase within that container portion acting to control the neutron production rate in the core, the absorber being in other than vapor phase communicating with the vapor phase in the container and receiving heat produced as a result of neutron absorption independent of the vapor phase neutron absorption. The effect of the container's insertion into the core upon the reactivity thereof is approximately the same as the effect of a void of equal volume; but in addition, the vapor in the container acts to absorb neutron flux in the core to control the rate of neutron production therein. As the vapor pressure increases with rising core temperature, the concentration of the vapor molecules or atoms within the core increases, thereby increasing the over-all poison cross-section of the reactor core so as to reduce its reactivity.

The invention further contemplates locating the container entirely within the core so that an increase in the core neutron flux causes an increase in the neutron absorber material, resulting in an increase in the temperature of the absorber material. Thus, with the absorber comprising a substance the vapor pressure of which increases with the temperature, the vapor concentration of the absorber in the container will increase to slow down the reaction whenever the temperature of the core increases, since the other than vapor phase component of the absorber will have increased in temperature. Also, the unvaporized absorber present in each container is at least that amount which would be completely vaporized at the maximum expected core temperature, for otherwise the absorber would become completely vaporized at a core temperature above which the reactor could not be controlled by increasing vapor density.

Another form of the invention consists in locating that portion of the container enclosing the other than vapor phase component of the absorber in contact with the coolant flowing from the reactor outside the core, so that heat generated by neutron absorption in the core or the coolant flowing therein is transmitted to that absorber phase. In most forms, the other than vapor phase component of the absorber will comprise a liquid; however, the invention contemplates the use of substances in solid phase which sublime in response to heat reception.

Inasmuch as the invention is broadly useful in connection with many different types of reactors having different possible core geometry, different sizes and quantities of neutron absorbent vapor containers can be inserted into the cores, depending upon their arrangement and construction, with the purpose in mind to approach in the design of the core and containers an over-all effect in operation such that the core can be treated as homogeneous as distinguished from heterogeneous, thereby decreasing the peak to average neutron flux level and increasing the average power level of the reactor.

With respect to the substances that may be used in the containers to absorb neutrons while in vapor phase, the vapor pressure characteristics of cadmium, cadmium oxide, cadmium bromide, cadmium chloride, cadmium iodide and cadmium fluoride are such that they may readily be utilized, and it is contemplated that other neutron absorbing substances having similar vapor pressure characteristics are also usable. It is suggested that cadmium or cadmium iodide be used where the maximum average core temperature is less than 1800° F.; whereas, for extremely high temperatures, cadmium oxide, cadmium bromide, cadmium chloride and cadmium fluoride are more desirable in view of their vapor pressure characteristics. The containers which are preferably but not necessarily tubular in form should be constucted of relatively non-neutron absorbing materials such as zirconium or tungsten and alloys thereof.

Figure 2:
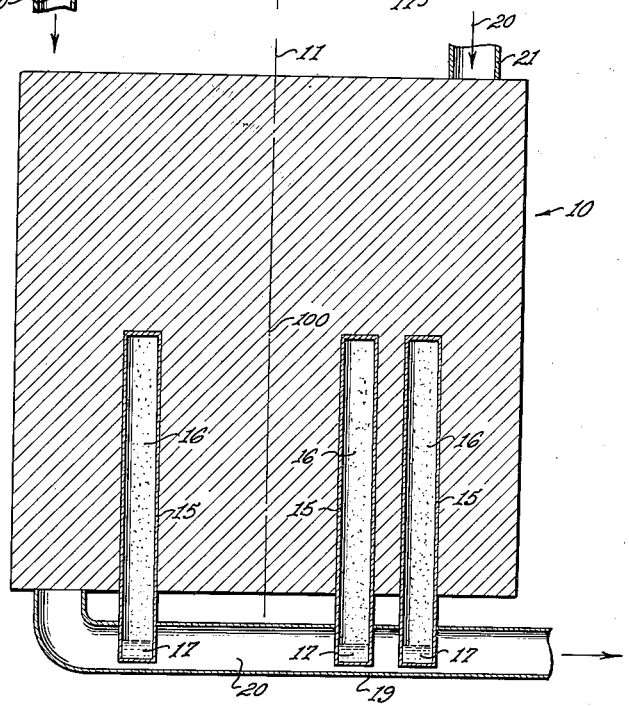

These and other features and objects of the invention, as well as the details of an allustrative embodiment, will be more fully understood from the following detailed description of the drawings, in which:

Fig. 1 is a section taken in elevation through a reactor core showing the vapor pressure containers fully within the core; and Fig. 2 illustrates a modified form of the invention wherein the other than vapor phase components of the neutron absorbers are contacted by reactor coolant outside the core.

In Fig. 1 the core 10 of a nuclear chain reactor has an approximate square shape in horizontal cross section and is cylindrical about vertical axis 11, although it is shown in this form merely for purposes of illustration in view of the many different possible core geometries. The actively reacting core contains neutrons produced by chain nuclear reaction of the fissionable material core content, the neutron density or flux in general being more concentrated at and near the core center 100 and reduced near the boundaries of the core.

Inserted in tubular voids in the core are a number of sealed tubular containers 15 filled with material having high capacity for absorbing neutrons, the material being in vapor and other than vapor phases, and the tubes constructed of zirconium or tungsten or alloys thereof.

The neutron absorber in vapor phase is shown at 16 within the upper portion of each tube closer to core center, whereas a reservoir of the absorber in other than vapor phase is shown at 17 in the lower portion of the tube farther from the center 100. The pressure of vapor 16 is determined by the temperature of the core and specifically the temperature of the phase 17 of the absorber in turn determined by its rate of neutron absorption. Thus, the concentration of the vapor phase molecules or atoms is controlled by the temperature of phase 17, said concentration increasing with temperature to effect an increase in neutron absorption and hence a decrease in core reactivity and temperature, establishing reactor stability. The reservoir end of the tube is placed near the core boundary so as to reduce its greater poisoning effect on the entire core, the lessened poisoning resulting from the fact that the neutron flux at the reservoir is at a much lower level that at points nearer the core center.

Furthermore, the tubes extend vertically so as to drain the typically liquid phase 17 condensate to the bottom of the tube in core region 14, and also to locate the vapor phase 16 in the upper portion of the tube closer to the core center than the other than vapor phase 17.

A suitable insulating layer 18 is shown surrounding the upper portion of each tubular container to maintain the upper portion of the tube walls at a higher temperature than the reservoir of the non-vapor phase of the absorbing material, preventing condensation of vapor on the warmer container walls, the tube walls enclosing the reservoir 17 being directly contacted by the coolant in the reactor, it being understood that coolant flows generally throughout the core from entrance 21 to exit 20. The insulating layer 18 may comprise a material such as aluminum oxide or other material depending upon the reactor core environment. The proper temperature distribution necessary to prevent condensation on the container wall may also be accomplished by a reactor coolant arrangement designed to cool the walls surrounding phase 16 to a lesser degree than the walls surrounding phase 17.

While only two tubular containers are shown in Fig. 1, it is contemplated that a sufficient number of tubes may be provided in relation to the core geometry that from the standpoint of the amount of neutron flux subject to absorption by the vapor in the tubes the reactor core approaches homogeneity as respects its predicted highly increased negative temperature coefficient of reactivity.

Where the maximum average core temperature is less than 1800° F., as in the water-moderated "slow" type reactor, zirconium tubes enclosing cadmium or cadmium iodide in vapor and liquid phases may be utilized, these absorbers having relatively lower boiling points; whereas for high core temperatures as are typically associated with "fast" breeder reactors, the tubes may comprise tungsten enclosing cadmium oxide, cadmium bromide, cadmium chloride or cadmium fluoride in vapor and liquid phases. These absorbers having relatively higher boiling points.

In Fig. 2 are illustrated a core and tubular containers of the same shape as in Fig. 1; however, the lower portions of the containers extend outside and below the core, and are received within a conduit 19 flowing fluid coolant 20 from within the core to the exterior for ultimate recirculation through the core via entrance 21. Thus the neutron absorber in liquid or solid phase at 17 receives heat produced upon neutron absorption in the core and coolant therein and transferred to that phase via the core coolant and the lower portions of the tubular containers, with the result that the vapor pressure of the absorber and the molecular or atomic concentration therein in the upper portion of each tube within the core are dependent upon the core temperature, increasing as the latter rises.

The over-all effect of the device shown in Figs. 1 and 2 upon the temperature coefficient of reactivity of the core is to substantially increase that coefficient in the negative direction so as to make the reactor more stable in its control and operation.

I claim:

1. The combination, comprising a nuclear chain reactor core wherein neutrons are produced, fluid core coolant within the core, sealed container means entirely within the core, and a neutron absorber within said container means including a body of unvaporized absorber concentrate and absorber vapor above said body in equilibrium contact with the body surface, a first portion of the container containing the unvaporized concentrate having a volume substantially less than a second portion of the container containing the vapor, said first portion of the container means being near the core boundary, said second portion of the container means having low neutron absorbing capacity in relation to said absorber, said body of absorber concentrate being in heat transfer relationship with the core coolant to control the absorber vapor density in response to changes in core power level and said vapor being adapted to absorb neutrons produced in the core, and said body of absorber concentrate and vapor comprising the same chemical substance.

2. The invention as defined in claim 1 in which said concentrate comprises a halogen salt of cadmium.

3. The invention as defined in claim 1 in which said concentrate comprises cadmium.

4. The invention as defined in claim 1 in which said container means comprise vertically elongated and spaced apart tubular containers, and including insulating material covering the walls of said second portions of the containers.

5. The combination, comprising a nuclear chain reactor core wherein neutrons are produced, a fluid core coolant discharging from within the core to the outside thereof, sealed container means including a first portion outside the core in contact with said coolant discharge and a second portion within the core, and a neutron absorber within said container means including a body of unvaporized absorber concentrate and absorber vapor above said body in equilibrium contact with the body surface, said first portion of the container means containing the unvaporized concentrate having a volume substantially less than said second portion of the container means containing the vapor, said second portion of the container means having low neutron absorbing capacity in relation to said absorber, said body of absorber concentrate being in heat transfer relationship with the core coolant discharge to control the absorber vapor density in response to changes in core temperature and said vapor being adapted to absorb neutrons produced in the core, and said body of absorber concentrate and vapor comprising the same chemical substance.

6. The invention as defined in claim 5 in which said concentrate comprises a halogen salt of cadmium.

7. The invention as defined in claim 5 in which said concentrate comprises cadmium.

8. The invention as defined in claim 5 in which said container means comprise vertically elongated and spaced apart tubular containers, and including insulating material covering the walls of said second portions of the containers.

References Cited in the file of this patent

UNITED STATES PATENTS 2,735,811  Weinberg et al. ---------- Feb. 21, 1956

OTHER REFERENCES

Stephenson: Introduction to Nuclear Engineering, McGraw-Hill, 1954; page 366.

Nucleonics, vol. 13 (No. 8, August 1955), pp. 30–33.

BMI-1119, U.S. Atomic Energy Commission document dated July 30, 1956, declassified March 4, 1957; 18 pages. Copy in 204–154.3.

TID–5275, Research Reactors, U.S. Government Printing Office, 1955, pages 100 and 105. Copy in Division 46.

Proceedings of the International Conference on the Peaceful Uses of Atomic Energy, August 8–20, 1955; vol. 3, pages 310, 311, 454. Published by United Nations, New York. Copy in Scientific Library.